US012658760B2

(12) United States Patent
Wascher et al.

(10) Patent No.: US 12,658,760 B2
(45) Date of Patent: Jun. 16, 2026

(54) DAMPING DEVICE FOR AN ELECTRIC MOTOR FOR A VENTILATOR

(71) Applicant: PITTWAY SARL, Rolle (CH)

(72) Inventors: Gerrit Wascher, Rolle (CH); Martin Koelker, Rolle (CH); Marek Kanuch, Rolle (CH); Martin Petersmann, Rolle (CH); Kay Jarysek, Rolle (CH)

(73) Assignee: PITTWAY SARL, Rolle (CH)

( * ) Notice: Subject to any disclaimer, the term of this patent is extended or adjusted under 35 U.S.C. 154(b) by 287 days.

(21) Appl. No.: 18/555,734

(22) PCT Filed: Apr. 22, 2022

(86) PCT No.: PCT/EP2022/060779
§ 371 (c)(1),
(2) Date: Oct. 17, 2023

(87) PCT Pub. No.: WO2022/223826
PCT Pub. Date: Oct. 27, 2022

(65) Prior Publication Data
US 2024/0204610 A1 Jun. 20, 2024

(30) Foreign Application Priority Data
Apr. 22, 2021 (EP) ..................................... 21170016

(51) Int. Cl.
*H02K 5/24* (2006.01)
*H02K 15/14* (2025.01)

(52) U.S. Cl.
CPC ............... *H02K 5/24* (2013.01); *H02K 15/14* (2013.01)

(58) Field of Classification Search
CPC .......... H02K 5/24; F16F 1/3732; F16F 15/08; F16F 2230/28; F04D 29/668
See application file for complete search history.

(56) References Cited

U.S. PATENT DOCUMENTS 3,830,595 A * 8/1974 Carpenter ............... F16F 15/08
310/91
4,253,634 A * 3/1981 Daniels .................... F16M 1/04
310/91
(Continued)

FOREIGN PATENT DOCUMENTS

CN 108443175 A * 8/2018 ............. F04D 25/08
DE 102011013685 A1 9/2012
(Continued)

OTHER PUBLICATIONS

Hong, Machine Translation of CN108443175, Aug. 2018 (Year: 2018).*
(Continued)

*Primary Examiner* — Eric Johnson
(74) *Attorney, Agent, or Firm* — Greenberg Traurig, LLP; Ryan Sharp; David J. Dykeman

(57) ABSTRACT

In one embodiment, the present disclosure provides a vibration damping device configured to decouple vibration of an electric motor for a ventilator, comprising: a base plate (140); a bearing unit (150) for supporting the electric motor, a plurality of decoupling elements (120), which are releasably coupled via retaining elements (151) to the bearing unit (150) and positionable between the bearing unit (150) and the base plate (140): wherein: the base plate (140) comprises mounting structures (141) for the decoupling elements (120) and fixing means (110) with a head (111): and each decoupling element (120) comprises adjacent to a recess at least one clamping section (121) for the corresponding fixing means (110) on the base plate (140); further wherein each of the fixing means (110) is configured to establish a force-fit and/or form-fit connection with the corresponding mounting structure (141) and the at least one clamping section (121) of the decoupling element (120) is pressed between a portion of the head (112) and the mounting structure (141) for a (Continued)

backlash free mounting of the decoupling element (120) to the base plate (140) in its mounted state. Due to the backlash-free mounting, the damping element cannot be loosened in the mounted state.

20 Claims, 5 Drawing Sheets

(56)                    References Cited

U.S. PATENT DOCUMENTS

| | | | |
|---|---|---|---|
| 4,805,868 | A | 2/1989 | Claude |
| 5,449,153 | A | 9/1995 | Catalano |
| 6,029,942 | A  * | 2/2000 | Daddis, Jr. .......... F04B 39/0044 |
| | | | 248/673 |

FOREIGN PATENT DOCUMENTS

| | | | | |
|---|---|---|---|---|
| EP | 1075075 | B1 | 11/2004 | |
| FR | 2761120 | A1 * | 9/1998 | ......... B60H 1/00521 |

OTHER PUBLICATIONS

Komowski, Machine Translation of FR2761120, Sep. 1998 (Year: 1998).*
International Search Report and Written Opinion in PCT International Application No. PCT/EP2022/060779 mailed Aug. 23, 2022.

* cited by examiner

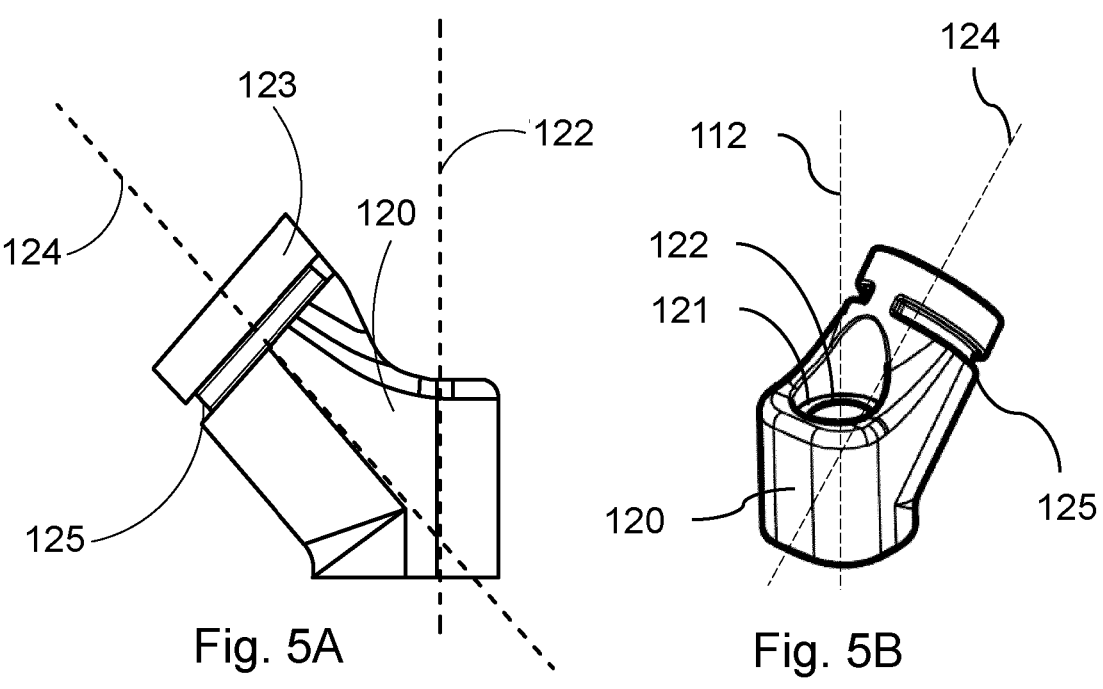
Fig. 5A
Fig. 5B
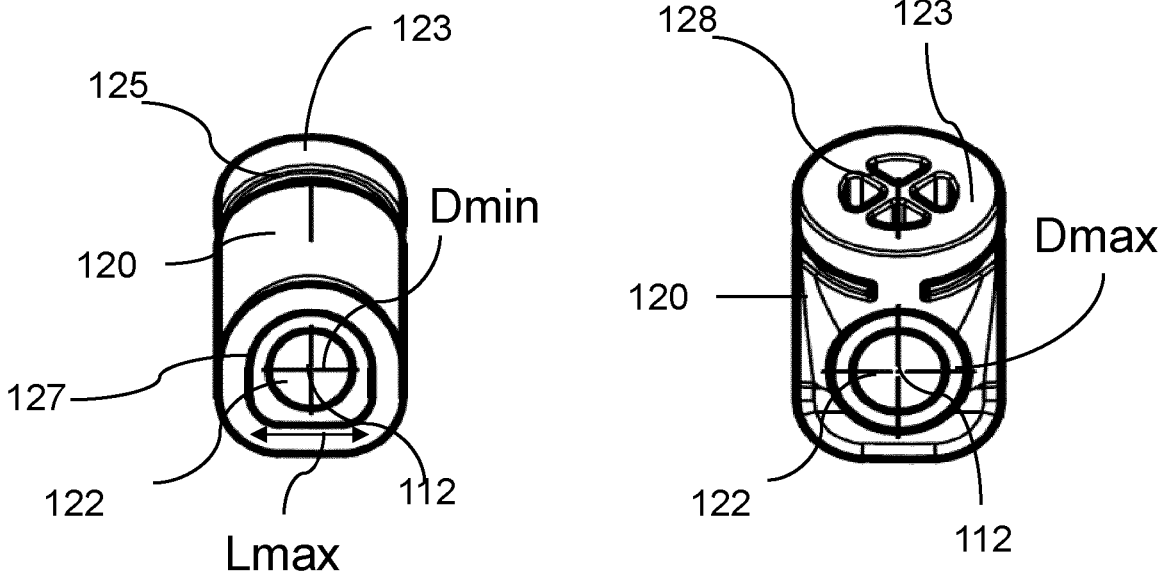
Fig. 5C
Fig. 5D

DAMPING DEVICE FOR AN ELECTRIC MOTOR FOR A VENTILATOR

CROSS-REFERENCE TO RELATED APPLICATIONS

This application is a U.S. National Phase patent application under 35 U.S.C. 371 of International Application No. PCT/EP2022/060779, filed Apr. 22, 2022, which claims priority to and the benefit of EP Application Serial No. 21170016.6, filed Apr. 22, 2021, each of which are incorporated herein by reference in their entireties.

FIELD OF THE DISCLOSURE

The present disclosure relates to a vibration damping device and a method for mounting an electric motor on a base plate to decouple vibration and finds particular, although not exclusive, utility in providing a vibration damping having particularly desirable damping properties for a ventilator such as a radial blower.

BACKGROUND

Radial fans typically include an impeller, a motor and a motor shaft configured to be rotated by a rotor of the motor and turn the fan impeller. The fan impeller is positioned in a housing with two openings to form a passage or conduit. The fan may be used to move fluids such as gas or combustion gas/air mixture. Such fan impellers are used, amongst others, for heating systems technology for providing a combustible mixture of air and gas. Gas-air blowers can be installed in boilers. The motor is typically installed on a base plate via a mounting structure. In operation, the motor creates vibrations that are passed to the base plate via the mounting structure. The vibrations are mainly caused by the torque-ripple (or cogging torque) of the motor and the imbalance of the motor. In many circumstances, the mechanical vibrations or structure-borne noise being passed to the base plate is undesirable. Mechanical stress due to vibrations may cause damage to the motor, the base plate and/or another component of the assembly. Especially, if single-phase electric motor are used, they have the disadvantage to have relatively high cogging torque and the vibrations have to be decoupled from the base plate and housing to prevent noise at the boiler.

A prior known attempt to solve this problem is to provide a vibration dampener between the motor and the base plate, to decouple some vibration between the motor and the base plate as for example known from EP 1 075 075 B1. However, this prior known solutions is a one piece design: Alternative designs, which prevent vibration and are easy to assemble are desirable. Further there is the need to provide a backlash-free connection between the vibration dampener and the base plate.

Therefore, it is desirable to provide a damping device to alleviate at least the above-mentioned problems and provide alternative solutions to provide a vibration dampener.

One object is to provide a backlash free connection between a decoupling element and a base plate. Objects and aspects of the present disclosure seek to provide a vibration damping device and a method for mounting an electric motor on a base plate to decouple vibration, to alleviate or solve these problems.

SUMMARY

According to a first aspect of the present disclosure, there is provided a vibration damping device configured to decouple vibration of an electric motor for a ventilator, comprising: a base plate; a bearing unit for supporting the electric motor, a plurality of decoupling elements, which are releasably coupled via retaining elements to the bearing unit and positionable between the bearing unit and the base plate; characterized in that the base plate comprises mounting structures for the decoupling elements and fixing means with a head; and each decoupling element comprises adjacent to a recess at least one clamping section for the corresponding fixing means on the base plate; wherein each of the fixing means is configured to establish a force-fit and/or form-fit connection with the corresponding mounting structure and the at least one clamping section of the decoupling element is pressed between a portion of the head and the mounting structure for a backlash free mounting of the decoupling element to the base plate in its mounted state.

A key advantage of the vibration damping device is that the decoupling elements can be mounted backlash-free on the base plate. The fixings are used to create a force-fit and/or form fit between the decoupling elements and the mounting structures, thereby created a backlash-free mounting. In this way, the damping element cannot be loosened in the mounted state. Therefore, the backlash-free mounting may be maintained.

Although the device is described as being configured to decouple vibration of an electric motor for a ventilator, preferably of a radial blower, the device may have other uses. The device may be used to decouple vibration between any two components. The device may decouple some or all vibration. The base plate may be a motor plate. The base plate may be a structure onto which other components of the electric motor are mounted.

In some embodiments, the recess is formed as a through hole configured to receive the fixing means. The through hole may have a circular or a non-circular cross-sectional shape. The through hole may have a polygonal cross-section. Alternatively, the through hole may have a non-polygonal cross-section, such as a D-shaped cross-section. The mounting structure may have a corresponding cross-sectional shape. In this way, rotation or twisting of the decoupling element relative to the base plate may be hindered or prevented.

In some embodiments, the cross-sectional shape and/or area of recess or the through hole may change along a length of the recess or through hole. For example, the recess or through hole may include an enlarged cross-sectional area adjacent to the head of the fixing means, in the mounted state, such that the head is at least partially positioned within the recess or through hole. Additionally or alternatively, the recess or through hole may include an enlarged cross-sectional area adjacent to the mounting structure, in the mounted state, such that the mounting structure is at least partially positioned within the recess or through hole. In some embodiments, the clamping section has a reduced cross-sectional area. By providing a reduced cross-sectional area within the through hole a stepped form is provided.

In some embodiments, the through hole, in the mounted state, extends along a fixation axis perpendicularly with regard to the base plate. In this way, the fixing means may be attached perpendicularly to the base plate. Alternatively, the fixation axis may be arranged non-perpendicularly with regard to the base plate.

In some embodiments, each of the decoupling elements comprises a resilient material to permit a press fit or crimping of the at least one clamping section between the head and the mounting structure. In the mounted state, the clamping section may comprise a shoulder adjacent to the head of the fixing means. In the unmounted state, the shoulder may be horizontal, whereas in the mounted state, the shoulder may remain horizontal if the clamping section is stiff. In case the material is more elastic, the head of the fixing may press into the clamping section and deform an upper region of the clamping section to form an angled or sloped shoulder. Providing a greater clamping force and/or a less stiff clamping section may increase an angle or a slope of the shoulder. The material of the decoupling element may have shore hardnesses between 30 and 80. All standard Shore hardnesses such as 30, 40, 55 and 70 Shore-A or within any range created with these hardnesses may be used. The resilience of the decoupling elements may be selected for example according to the weight of the electric motor and provide desirable vibration decoupling properties, whilst also holding the bearing unit in the correct position relative to the base plate.

In some embodiments, the fixing means comprises a pin, a bolt, a rivet or a screw configured to be positioned within the recess or through hole. The base plate may comprise a through hole, or a threaded through hole configured to engage with the fixing means. The fixing means may comprise a threaded post extending from the base plate and a nut configured to be received on the post and provide the head of the fixing means.

In some embodiments, the decoupling elements have a longitudinal axis, and the longitudinal axis of each decoupling element is directed to a central axis of the base plate such that the central axis of the base plate and the longitudinal axis intersect. In some embodiments, the longitudinal axis of each decoupling element is angled relative to the central axis of the base plate at an angle between 30 and 70 degrees. For example, the angle may be approximately 30, 40, 45, 50, 60 or 70 degrees, or within any range created with these example angles. In this way, the longitudinal axis of each decoupling element may be directed towards a centre of gravity of the motor, thereby removing the need for additional decoupling elements to support the bearing unit against gravity. Additionally, more desirable anti-vibration properties may be provided. In particular, sideward vibrations and resultant forces may be dampened to a greater extent, when compared to a decoupling element having its longitudinal axis parallel to the central axis of the base plate.

In some embodiments, each mounting structure protrudes from the base plate and is configured to have at least partially a non-circular cross-section such that the rotation of the corresponding decoupling element around the fixation axis is limited or prevented in the mounted state. The cross-sectional shape of the mounting structures may correspond to the cross-sectional shape of the recess or through hole. In some embodiments, each mounting structure has at least partially a polygonal cross-section configured to inter-engage or mate with a corresponding inner cross-section of the through hole adjacent to the base plate. In some embodiments, each mounting structure has a cross section with a stepped form, wherein at least the basic step is connected to the base plate and has a polygonal cross-section or a partially polygonal section. The basic step may be the portion of the part of the mounting structure that is attached to the base plate. Each mounting structure may have a pyramid or a stepped pyramid shape, with the base of the pyramid attached to the base plate. Alternatively, each mounting structure may have a ridge or enlargement around a middle of the mounting structure configured to have a force-fit and/or form-fit with the decoupling element.

In some embodiments, each of the plurality of decoupling elements comprises an elastic material, preferably silicone or natural rubber or the like. Elastic materials, and silicone in particular, have been found to provide desirable decoupling properties as well as being relatively easy to manufacture. Each of the decoupling elements is monolithic that is to say formed of one piece.

In some embodiments, each of the plurality of decoupling elements are tubular and have at least partially a connecting web. The connecting web may support or stiffen the tubular decoupling element in the region surrounding the connecting web.

In some embodiments, at least three mounting structures and corresponding retaining elements are evenly distributed around a central axis of the base plate such that angles formed between adjacent mounted decoupling elements are substantially the same. Any number of mounting structures and corresponding retaining elements may be provided. A greater number may be provided for a larger motor. For example, four, five, six or seven may be provided. In some embodiments, the mounting structures and corresponding retaining elements may be unevenly distributed around the central axis of the base plate. The arrangement may be dependent on the use and vibration characteristics of the motor. For example, if the motor is arranged such that a motor shaft is arranged horizontally, a greater number of mounting structures and corresponding retaining elements may be provided on a lower side of the motor, to support the weight of the motor.

In some embodiments, each retaining element comprises a slot configured to inter-engage or mate with a corresponding groove on the decoupling element. In an alternative embodiment, each retaining element comprises a groove configured to inter-engage or mate with a corresponding slot on the decoupling element. Accordingly, a fixing-free connection may be made between the retaining elements and the decoupling elements and said connection may be easily assembled.

According to a second aspect of the present disclosure, there is provided a method for mounting an electric motor on a base plate to decouple vibration, comprising the method steps:

providing a base plate comprising a plurality of mounting structures and fixing means with a head; releasably coupling a bearing unit to a plurality of decoupling elements via corresponding retaining elements; characterized in that the method further comprises: positioning the decoupling elements such that a corresponding mounting structure is protruding into a recess or through hole of the corresponding decoupling element, wherein each decoupling element comprises adjacent to a recess at least one clamping section; inserting fixing means into the mounting structure and fixing each decoupling element on the base plate with the fixing means, wherein each fixing means establishes a force-fit and/or form-fit connection with the corresponding mounting structure while the at least one clamping section of the decoupling element is fixed between at least a portion of the head and the mounting structure for a backlash free mounting of the decoupling element to the base plate in its mounted state.

It is to be understood that the second aspect of the present disclosure may include any or each of the features described with regard to the first aspect. The appropriate provision and necessary assembly is envisaged.

BRIEF DESCRIPTION OF THE FIGURES

Various features and advantages of the invention will be set forth in part in the following description of Figures referring to various examples of the invention. In this context it is noted that the dimensions shown in all Figures of this disclosure are not to scale. The illustrations are simplified and not in each Figure all components are indicated with reference numerals and like reference numerals may be carried forward. In this description reference is made to the accompanying Figures, in which:

FIG. 5a is a first side view of the decoupling element shown in FIG. 1 in an unmounted state;

FIG. 5b is a perspective view of the decoupling element shown in FIG. 5a;

FIG. 5c is a bottom view of the decoupling element shown in FIG. 5a; and FIG. 5d is a plan view of the decoupling element shown in FIG. 5a.

DETAILED DESCRIPTION

Figure 1:
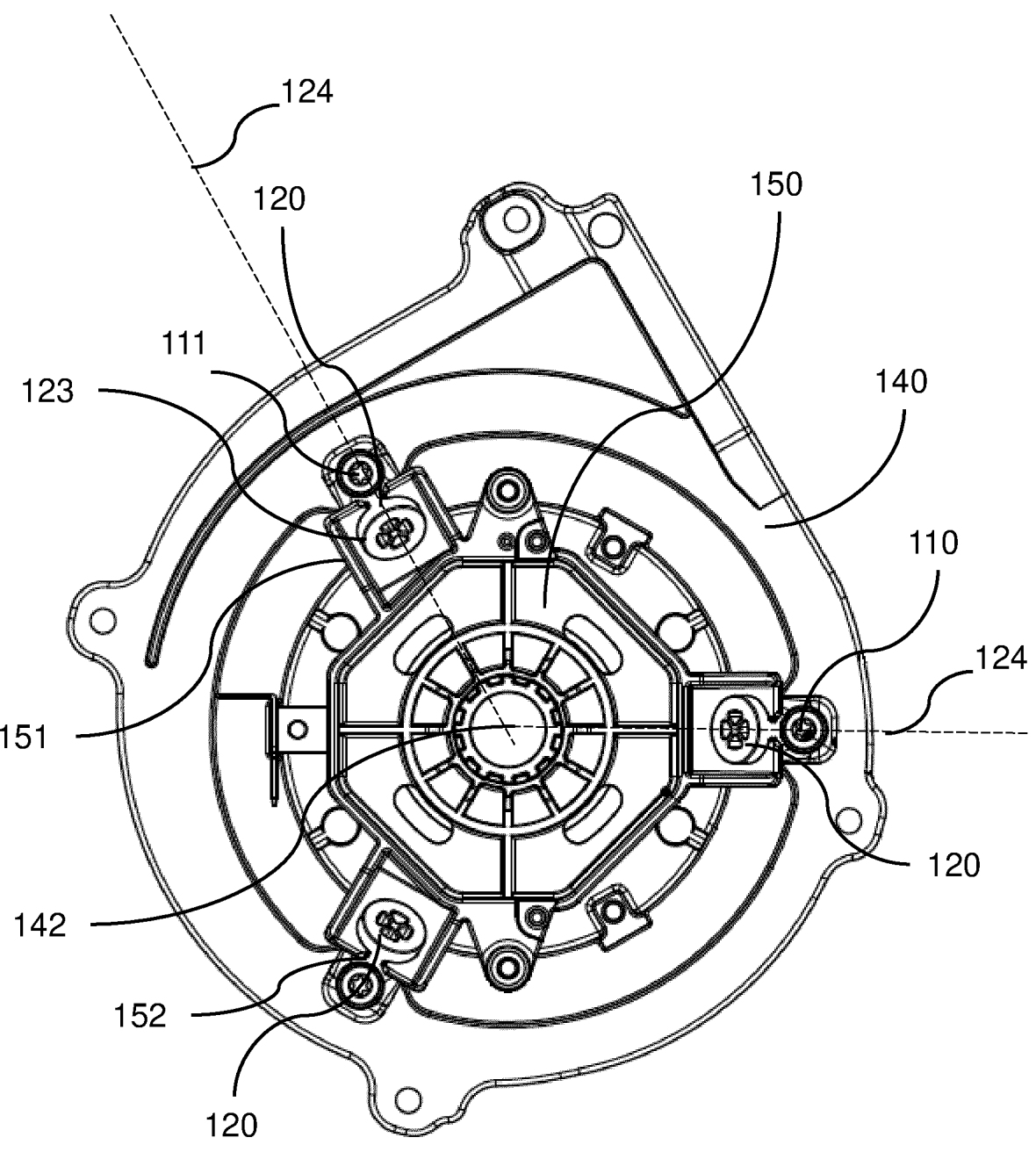
FIG. 1 is a plan view of a motor mounted on a base plate with backlash-free decoupling elements.

FIG. 1 is a plan view of a motor mounted on a base plate 140 with backlash-free decoupling elements 120. Three decoupling elements 120 are equally spaced around a central axis 142 of the base plate 140 such that there is an approximately 120 degree angle between each adjacent decoupling element 120. Each decoupling element 120 is attached to the base plate 140 with fixing means 110. The fixing means 110 includes a head 111 and is configured to clamp the decoupling element 120 between the head 111 and the base plate 140.

The decoupling elements 120 are configured to attach to a retaining element 151 provided on a bearing unit 150 of the motor. Each decoupling element 120 includes a groove at its distal end 123 that is configured to inter-engage with a slot 152 on the retaining element 151. Each decoupling element 120 is arranged such that a longitudinal axis 124 of the decoupling element 120, arranged axially through the distal end 123, intersect with the longitudinal axes 124 of each other decoupling element 120 at a centre of the base plate 140 and the central axis 142 of the base plate 140.

In use, vibrations from the motor are decoupled from the base plate 140 by the decoupling elements 120. Clamping the decoupling elements 120 between the head 111 of the fixing means 110 and the base plate 140 means that a backlash-free attachment is provided, as discussed in more detail with reference to FIG. 2.

Figure 2:
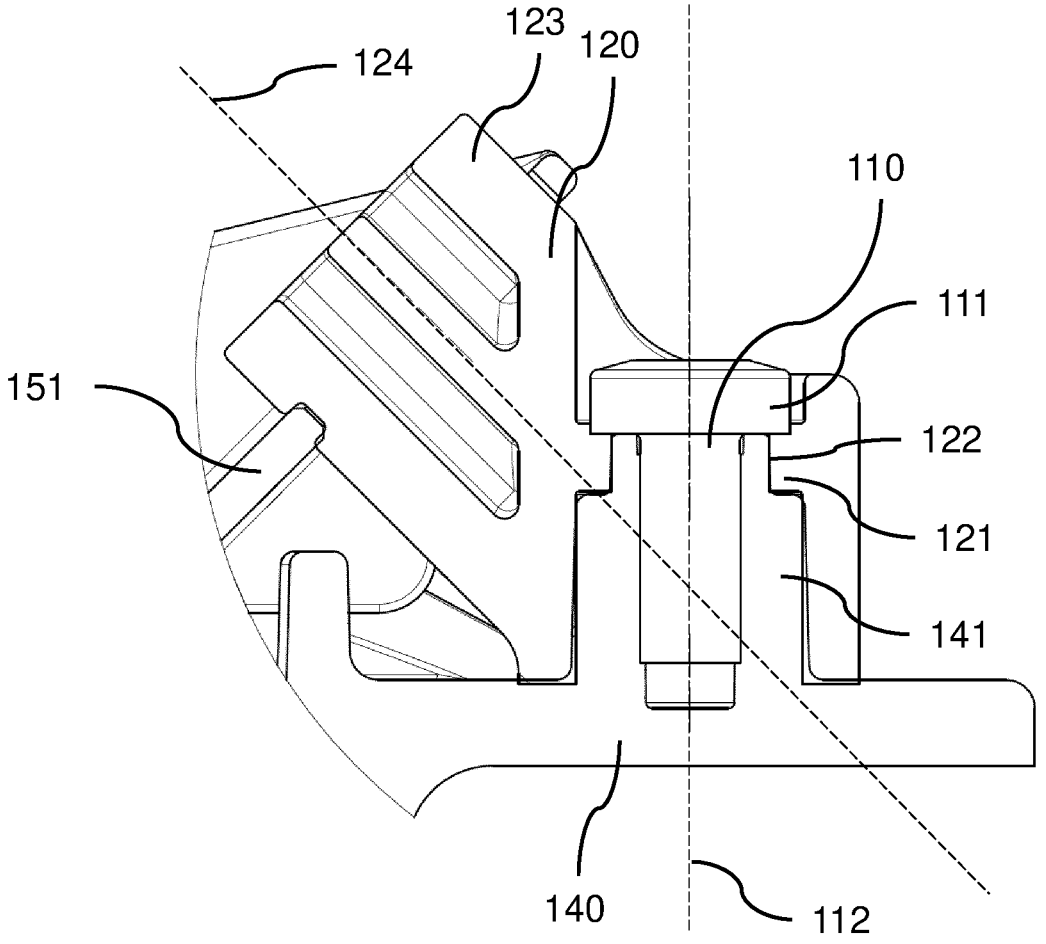
FIG. 2 is a cross-sectional view of the decoupling element shown in FIG. 1 in the mounted state.

FIG. 2 is a cross-sectional view of the decoupling element 120 shown in FIG. 1 in the mounted state. The decoupling element 120 is mounted on the base plate 140. The base plate 140 includes a mounting structure 141 corresponding to each decoupling element 120. The mounting structure 141 protrudes from the upper surface of the base plate 140. The decoupling element 120 includes a through hole 122 into which the mounting structure 141 is received. The mounting structure 141 includes a threaded socket such that a bolt of the fixing means 110 is releasably attachable to the base plate 140. With the decoupling element 120 in the mounted state, a clamping section 121 of the decoupling element 120 is clamped between the head 111 and the mounting structure 141 to provide a backlash-free mounting. The fixing means

110 is attached to the base plate 140 along a fixation axis 112 which is approximately perpendicular to the upper surface of the base plate 140.

The through hole 122 of the decoupling element 120 has in the vertical three sections of different cross-section. The first and upper section has an enlarged cross-section adjacent to the head 111 of the fixing means 110 such that the head 111 is partially positioned within the through hole 122 in the shown mounted state. Further, the through hole 122 includes as a third section an enlarged cross-section adjacent to the mounting structure 141. The cross-section of the clamping section 121 is between the enlarged cross-sections and smaller than the adjacent upper and lower cross-sections. Thus the through hole 122 has a stepped form. The lower section of the through hole 122 facing the mounting structure has a D-shaped cross-section (see also bottom view of FIG. 5c). The mounting structure 141 also has a D-shaped cross-section, configured to inter-engage and mount with the through-hole to hinder or prevent twisting of the decoupling element 120 on the mounting structure 141. The decoupling element 120 is formed from an elastic and resilient material such as silicon. Accordingly, the head 111 of the fixing means 110 presses into and deforms an upper portion of the decoupling element 120 adjacent to the through hole 122.

The distal end 123 of the decoupling element 120 is attached to the bearing unit of the motor via retaining elements 151 on the bearing unit. The longitudinal axis 124 of the decoupling element 120 is arranged approximately 45 degrees relative to the fixation axis 112.

Figure 3:
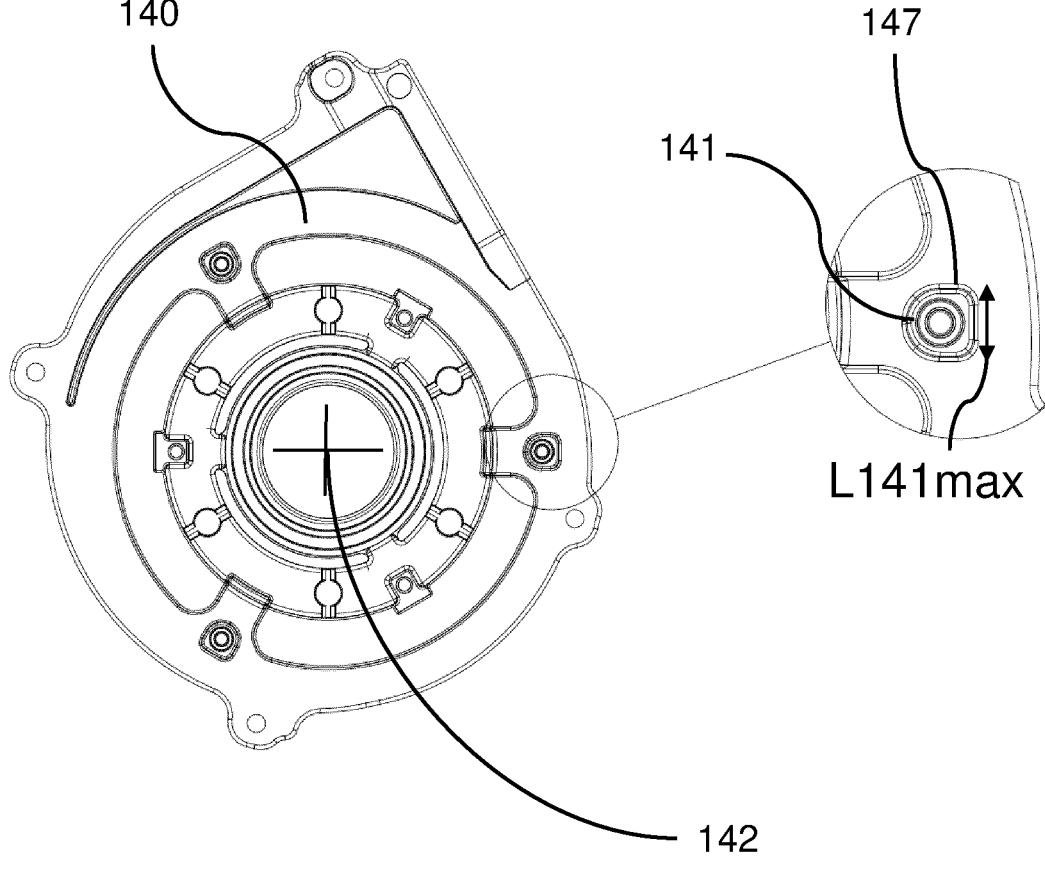
FIG. 3 is a plan view of the base plate shown in FIG. 1 with an enlarged view of a mounting structure.

FIG. 3 is a plan view of the base plate 140 shown in FIG. 1 with an enlarged view of a mounting structure 141. The mounting structures 141 have a D-shaped cross-section with a flat portion of the D facing away from the central axis 142 of the base plate 140. A maximum length L141max between two corners of the cross-section of the mounting element 141 may be equal to or larger than a maximum corresponding length of the cross-section of the through hole 122 of the decoupling element 120. Accordingly, a force-fit and/or form-fit may be provided.

Figure 4:
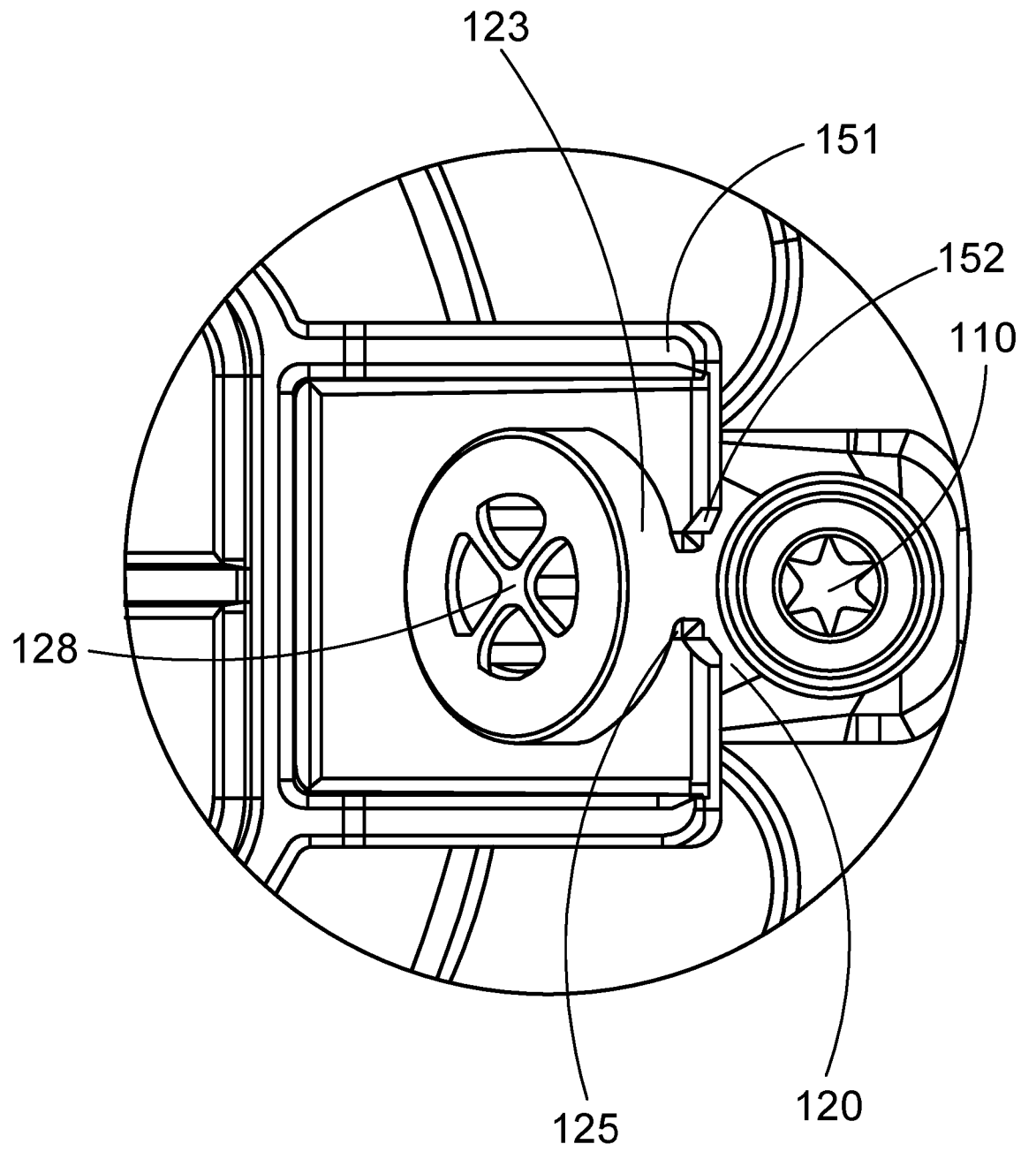
FIG. 4 is an enlarged plan view of the decoupling element shown in FIG. 1 in the mounted state.

FIG. 4 is an enlarged plan view of the decoupling element 120 shown in FIG. 1 in the mounted state. The decoupling element 120 is generally tubular and includes a cross-shaped stabilizing connecting web 128 at the distal end 123 to stiffen and stabilize the decoupling element 120 in this region. The distal end 123 includes a groove 125 that inter-engages with a slot 152 in the retaining element 151 on the bearing unit 150. The head 111 of the fixing means 110 includes an internal hexagonal screw drive, although any other tool attachment type may be provided.

FIG. 5a is a first side view of the decoupling element 120 shown in FIG. 1 in an unmounted state. The longitudinal axis 124 of the decoupling element 120 is arranged approximately 45 degrees relative to the fixation axis 112. Accordingly, the decoupling elements 120 are able to support the motor against gravity. The groove 125 passes around almost the entire circumference of the decoupling element 120 adjacent to the distal end 123 of the decoupling element 120. Other lengths of the circumferential groove 125 may be provided as long as it can inter-engage with the corresponding slot 152 of the retaining element 150 (shown e.g. in FIG. 1)

FIG. 5b is a perspective view of the decoupling element 120 shown in FIG. 5a. The clamping section 121 is shown to be a reduction in the cross-sectional area of the through hole 122.

FIG. 5c is a bottom view of the decoupling element 120 shown in FIG. 5a. An inner cross-section 127 of the through hole 122 that is adjacent to the base plate 140 in the mounted state is D-shaped to inter-engage with the D-shaped mounting structure 141. A minimum inner diameter Dmin of the through hole 122 is smaller than a width of the head 111 of the fixing means 110 and a width of the mounting structure 141, such that the clamping section 121 is clamped there between. The maximum distance Lmax between two corners of the D-shaped cross-section 127 is configured to provide a press-fit and/or form fit and the maximum distance Lmax may be preferably equal to or smaller than the maximum length L141max between two corners of the cross-section of the mounting element 141.

FIG. 5d is a plan view of the decoupling element 120 shown in FIG. 5a. The through hole 122 has a maximum diameter Dmax that is larger than the diameter or width of the head 111 of the fixing means 110 such that the head 111 is at least partially received within the through hole 122. The decoupling element 120 includes a stabilizing connecting web 128 at the distal end 123 of the decoupling element to stabilize and stiffen the decoupling element 120 in this region.

REFERENCE LIST

110 Fixing means
111 Head of the fixing means
112 Fixation axis
120 Decoupling element
121 Clamping section
122 Through hole
123 Distal end of decoupling element facing the bearing unit 150
124 Longitudinal axis
125 Groove of the decoupling element
127 Inner polygonal cross-section of through hole at base plate 140
128 Stabilizing connecting web
140 Base plate
141 Mounting structure
142 Central axis of the base plate 140
147 Polygonal circumference of the mounting structure 141
150 Bearing unit
151 Retaining element
152 Slot in the retaining element 151
Dmin Minimum inner diameter of the through hole 122
Dmax Maximum inner diameter of the through hole to receive the head 111
Lmax Maximum length between two corners of the inner polygonal cross-section 127
L141max Maximum length between two corners of outer polygonal cross-section of mounting element 141

The invention claimed is:

1. A vibration damping device configured to decouple vibration of an electric motor for a ventilator, comprising:
   a base plate;
   a bearing unit for supporting the electric motor, and
   a plurality of decoupling elements, which are releasably coupled via retaining elements to the bearing unit and positionable between the bearing unit and the base plate;
   wherein the base plate comprises mounting structures for the plurality of decoupling elements and fixing means with a head; and
   each decoupling element comprises adjacent to a recess at least one clamping section for a corresponding fixing means on the base plate;

wherein each of the fixing means is configured to establish a force-fit and/or form-fit connection with the corresponding mounting structure and the at least one clamping section of the decoupling element is pressed between a portion of the head and the mounting structure for a backlash free mounting of the decoupling element to the base plate in its mounted state,
   wherein the recess extends along a fixation axis,
   wherein the decoupling elements have a longitudinal axis,
   wherein the longitudinal axis of the decoupling elements is arranged at an acute angle relative to the fixation axis.

2. The vibration damping device of claim 1, wherein the recess is formed as a through hole configured to receive the fixing means.

3. The vibration damping device of claim 2, wherein the through hole, in the mounted state, extends along a fixation axis perpendicularly with regard to the base plate.

4. The vibration damping device of claim 3, wherein each mounting structure protrudes from the base plate and is configured to have at least partially a non-circular cross-section such that the rotation of the corresponding decoupling element around the fixation axis is limited or prevented in the mounted state.

5. The vibration damping device of claim 4, wherein each mounting structure has a polygonal cross-section configured to inter-engage or mate with a corresponding inner cross-section of the through hole adjacent to the base plate.

6. The vibration damping device of claim 5, wherein each mounting structure has a cross section with a stepped form, wherein at least a basic step is connected to the base plate and has a polygonal cross-section.

7. The vibration damping device of claim 6, wherein each of the plurality of decoupling elements comprises an elastic material.

8. The vibration damping device of claim 7, wherein each of the plurality of decoupling elements are tubular and have at least partially a connecting web.

9. The vibration damping device of claim 3, wherein each of the decoupling elements comprises a resilient material to permit a press fit or crimping of the at least one clamping section between the head and the mounting structure.

10. The vibration damping device of claim 9, wherein the fixing means comprises a pin, a bolt, a rivet or a screw configured to be positioned within the recess or through hole.

11. The vibration damping device of claim 10, wherein the decoupling elements have a longitudinal axis, and the longitudinal axis of each decoupling element is directed to a central axis of the base plate such that the central axis of the base plate and the longitudinal axis intersect.

12. The vibration damping device of claim 1, wherein each of the decoupling elements comprises a resilient material to permit a press fit or crimping of the at least one clamping section between the head and the mounting structure.

13. The vibration damping device of claim 1, wherein the fixing means comprises a pin, a bolt, a rivet or a screw configured to be positioned within the recess or through hole.

14. The vibration damping device of claim 1, wherein the decoupling elements have a longitudinal axis, and the longitudinal axis of each decoupling element is directed to a central axis of the base plate such that the central axis of the base plate and the longitudinal axis intersect.

15. The vibration damping device of claim 14, wherein the longitudinal axis of each decoupling element is angled relative to the central axis of the base plate at an angle between 30 and 70 degrees.

16. The vibration damping device of claim 1, wherein each of the plurality of decoupling elements comprises an elastic material.

17. The vibration damping device of claim 1, wherein each of the plurality of decoupling elements are tubular and have at least partially a connecting web.

18. The vibration damping device of claim 1, wherein at least three mounting structures and corresponding retaining elements are evenly distributed around a central axis of the base plate such that angles formed between adjacent mounted decoupling elements are substantially the same.

19. The vibration damping device of claim 1, wherein each retaining element comprises a slot configured to inter-engage or mate with a corresponding groove on the decoupling element.

20. A method for mounting an electric motor on a base plate to decouple vibration, comprising:

providing a base plate comprising a plurality of mounting structures and fixing means with a head;

releasably coupling a bearing unit to a plurality of decoupling elements via corresponding retaining elements;

positioning the decoupling elements such that a corresponding mounting structure is protruding into a recess or through hole of the corresponding decoupling element, wherein each decoupling element comprises adjacent to a recess at least one clamping section, wherein the recess extends along a fixation axis, wherein the decoupling elements have a longitudinal axis, wherein the longitudinal axis of the decoupling elements is arranged at an acute angle relative to the fixation axis; and inserting fixing means into the mounting structure and fixing each decoupling element on the base plate with the fixing means, wherein each fixing means establishes a force-fit and/or form-fit connection with the corresponding mounting structure while the at least one clamping section of the decoupling element is fixed between at least a portion of the head and the mounting structure for a backlash free mounting of the decoupling element to the base plate in its mounted state.

* * * * *